US007059177B2

(12) United States Patent
Kobayashi et al.

(10) Patent No.: US 7,059,177 B2
(45) Date of Patent: Jun. 13, 2006

(54) FUEL VAPOR LEAK CHECK MODULE

(75) Inventors: Mitsuyuki Kobayashi, Gamagori (JP); Yoshichika Yamada, Kuwana-gun (JP); Hitoshi Amano, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/923,774

(22) Filed: Aug. 24, 2004

(65) Prior Publication Data

US 2005/0044939 A1 Mar. 3, 2005

(30) Foreign Application Priority Data

Aug. 25, 2003 (JP) ............................ 2003-300157

(51) Int. Cl.
*G01M 19/00* (2006.01)

(52) U.S. Cl. ....................... 73/118.1; 73/116; 73/117.2; 73/117.3

(58) Field of Classification Search ..................... None
See application file for complete search history.

(56) References Cited

U.S. PATENT DOCUMENTS 5,890,474 A 4/1999 Schnaibel et al.
2002/0162457 A1* 11/2002 Hyodo et al. ................. 96/109

FOREIGN PATENT DOCUMENTS

JP A-10-90107 4/1989

OTHER PUBLICATIONS

U.S. Appl. No. 10/911,555, filed Aug. 2004, Kobayashi et al.
U.S. Appl. No. 10/923,005, filed Aug. 2004, Tsuruta et al.
U.S. Appl. No. 10/923,786, filed Aug. 2004, Kano et al.
U.S. Appl. No. 10/922,999, filed Aug. 2004, Kobayashi et al.

* cited by examiner

*Primary Examiner*—Edward Lefkowitz
*Assistant Examiner*—Freddie Kirkland, III
(74) *Attorney, Agent, or Firm*—Nixon & Vanderhye P.C.

(57) ABSTRACT

A fuel vapor leak check module has a pump for generating a pressure gradient between an inside and an outside of a fuel tank. The pump is driven by a motor which has driving shaft supported by a bearing. A lubricant is provided between the driving shaft and the bearing. When the pump is operated, a pressure gradient between a pump-side space and a motor-side space is generated whereby a lubricant is introduced from one of the pump-side space and the motor-side space to another, so that the introduced lubricant deteriorates the pump performance or motor performance. To avoid such a situation, communication passage is provided which communicates the motor-side space and the pump-side space. The inner pressure of the motor-side space becomes equal to that of the pump-side space.

5 Claims, 9 Drawing Sheets

FUEL VAPOR LEAK CHECK MODULE

CROSS REFERENCE TO RELATED APPLICATION

This application is based on Japanese Patent Application No. 2003-300157 filed on Aug. 25, 2003, the disclosure of which is incorporated herein by reference.

FIELD OF THE INVENTION

The present invention relates to a fuel vapor leak check module, which detects leakage of fuel vapor generated in a fuel tank, especially relates to a pump and a motor thereof. The pump pressurizes or depressurizes the interior of the fuel tank and the motor drives the pump.

BACKGROUND OF THE INVENTION

In view of protecting the environment, fuel vapor escaping from the fuel tank has been controlled as well as the exhaust emission control. According to the regulation established by the Environmental Protection Agency (EPA) and the California Air Resourced Board (CARB), a leak detection of the fuel vapor flowing out through a small aperture of the fuel tank is strictly required.

A conventional leak check system shown in JP-10-90107A, which is a counterpart of U.S. Pat. No. 5,890,474, has a pump which generate a pressure gradient between an inside and an outside of a fuel tank. When the fuel vapor leaks from the fuel tank, a load of a motor driving the pump fluctuates. The detection of fuel vapor leakage is conducted by checking the fluctuation of the motor load.

For generating the pressure gradient between the inside and the outside of the fuel tank, the interior of the fuel tank must be pressurized or depressurized by the pump. When the pump pressurizes the interior of the fuel tank, if an opening or a hole causing leakage of fuel vapor exists at the fuel tank, the fuel vapor is expelled to the atmosphere through the opening or the hole. To prevent the leakage of the fuel vapor into the atmosphere, the interior of the fuel tank must be depressurized.

The motor has a driving shaft for driving the pump, the driving shaft being supported by a bearing. A lubricant is provided between the driving shaft and the bearing to obtain a smooth rotation of the driving shaft.

When the interior of the fuel tank is depressurized, the inside pressure of the pump decreases and the inside pressure of the motor is kept atmospheric pressure. Thus, the lubricant is introduced into the pump due to the pressure gradient, so that the lubricant adheres to the inner surface of the motor to cause a deterioration of the motor performance.

On the other hand, when the interior of the fuel tank is pressurized, the lubricant is introduced into the motor to deteriorate the motor performance.

SUMMARY OF THE INVENTION

An object of the present invention is to maintain the inner pressure of the pump as same as the inner pressure of the motor, so that the lubricant at the bearing is hardly introduced into the motor or the pump.

According to the present invention, the pump and the motor are isolated from each other by an isolating plate through which a driving shaft of the motor penetrates. The interior space of the pump and the interior space of the motor are communicated with each other through a communicating passage. Thus, the inner pressures of those are substantially equal to prevent the lubricant from flowing between the motor and the pump.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

First Embodiment

Figure 2:
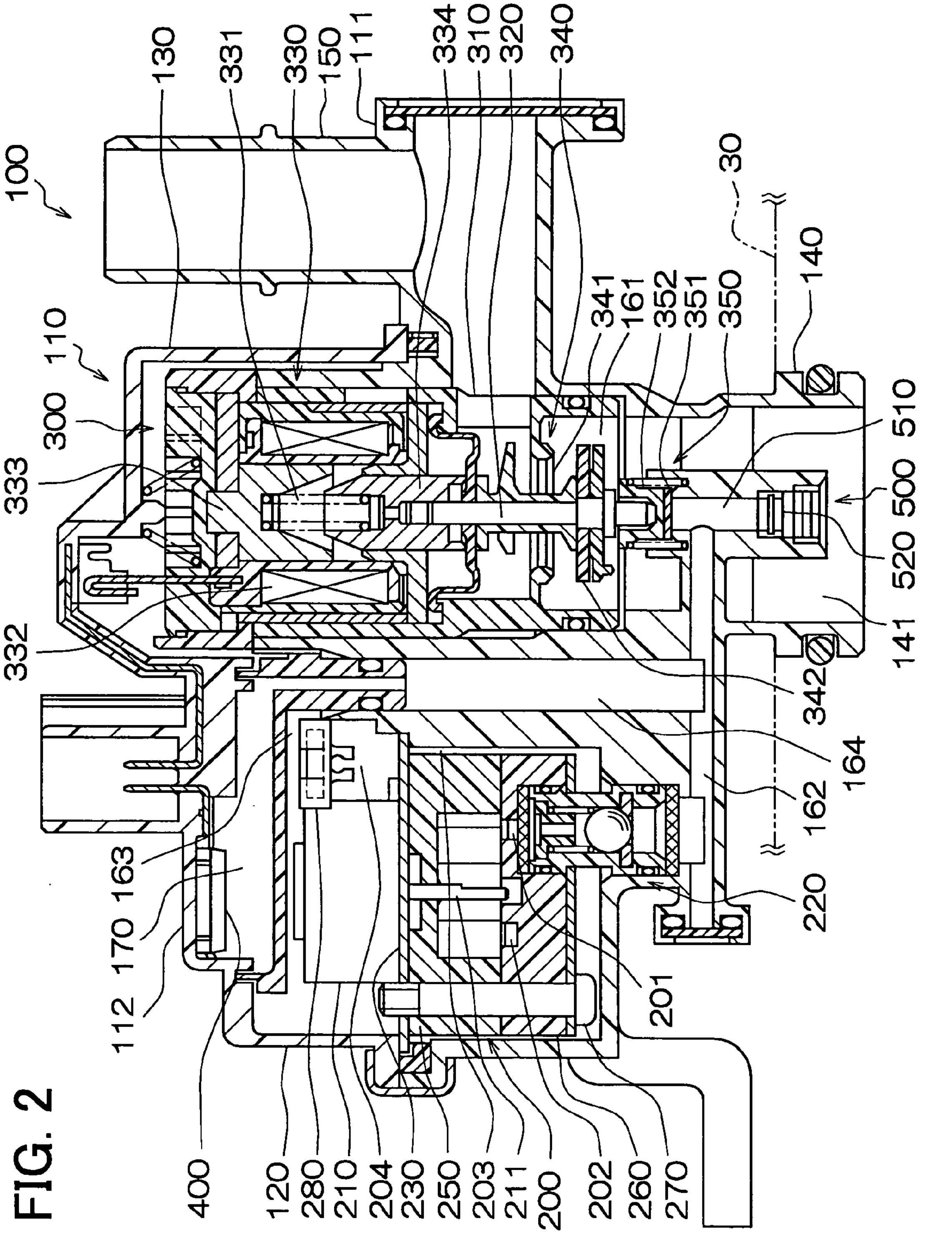
FIG. 2 is a cross sectional view of the fuel vapor leak check module of the first embodiment.
Figure 3:
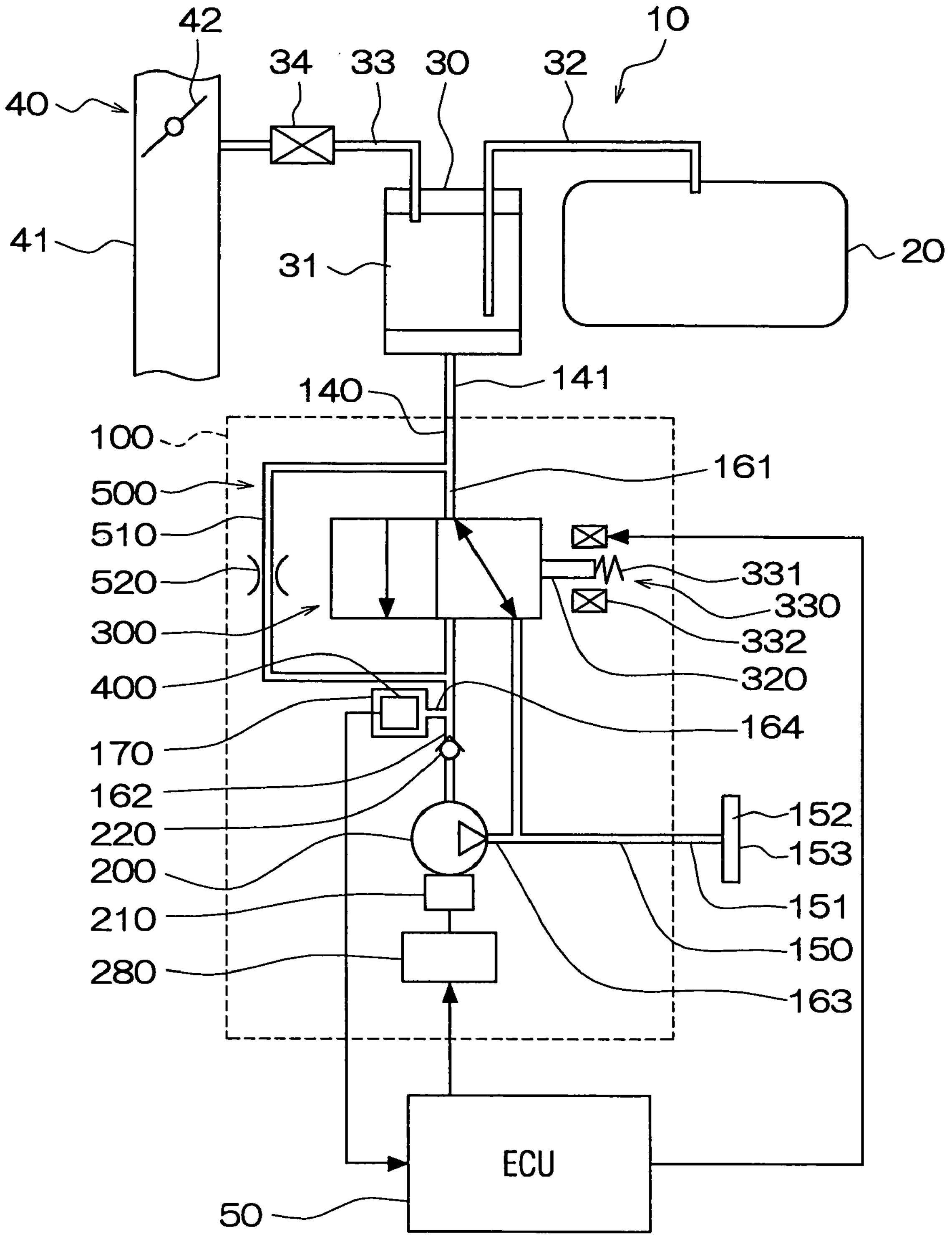
FIG. 3 is a schematic view showing a fuel vapor leak check system.

FIGS. 2 and 3 show a fuel vapor leak check system to which a fuel vapor leak check module is applied. The fuel vapor leak check system is referred to as the leak check system, the fuel vapor leak check module is referred to as the leak check module herein after.

The leak check system 10 includes the leak check module 100, a fuel tank 20, a canister 30, an intake device 40, and an ECU 50. As shown in FIG. 3, the leak check module 100 is provided with a housing 110, a pump 200, brushless motor 210, a switching valve 300, and a pressure sensor 400. The leak check module 100 is disposed above the fuel tank 20 and the canister 30 to prevent a flow of a liquid fuel or other liquid which flows from the fuel tank 20 into the canister 30 and the leak check module 100.

The housing 110 comprises a housing body 111, and a housing cover 112. The housing 110 accommodates he pump 200, the brushless motor 210, and the switching valve 300. The housing 110 forms a pump accommodating space 120 and a valve accommodating space 130 therein. The pump 200 and the brushless motor 210 are disposed in the pump accommodating space 120, and the switching valve 300 is disposed in the valve accommodating space 120. The housing body 111 is provided with a canister port 140 and an atmospheric vent port 150. The canister port 140 communicates with the canister 30 through a canister passage 141. The atmospheric vent port 150 communicates with an atmospheric passage 151 having an open end 153 at which an air filter 152 is disposed. The atmospheric passage 151 communicates with an atmosphere. The housing body 111 can be made with the housing of the canister 30 integrally.

As shown in FIG. 2, the housing 110 has a connecting passage 161, a pump passage 162, a discharge passage 163, a pressure introducing passage 164, and a sensor room 170. The connecting passage 161 connects the canister port 140 with the atmospheric vent port 150. The pump passage 162 connects the connecting passage 161 with an inlet port 201 of the pump 200. The discharge passage 163 connects the outlet port 202 of the pump 200 to the atmospheric vent port 150. The pressure introducing passage 164 is branched from the pump passage 162 and connects the pump passage 162 and the sensor room 170. Since the sensor room 170 communicates with the pressure introducing passage 164, the inner pressure of the sensor room 170 is almost the same as the pressure in the pump passage 162.

The discharge passage 163 is formed between the housing 110 and the pump 200 and between the housing 110 and the brushless motor 210 in the pump accommodating space 120, and is formed between the housing 110 and the switching valve 300 in the valve accommodating space 130. An air discharged from the outlet port 202 of the pump flows into a clearance (not shown) between the switching valve 300 and the housing 110 through a clearance 203 between the pump 200 and the housing 110, and a clearance 204 between the brushless motor 210 and the housing 110. The air flowing into the clearance between the switching valve 300 and the housing 110 flows into the atmospheric vent port 150 along the clearance.

The housing 110 has an orifice portion 500 at the side of the canister port 140. The orifice portion 500 has an orifice passage 510 which branches from the canister passage 141. The orifice passage 510 connects the canister port 140 with the pump passage 162 and has an orifice 520 therein. The orifice 520 corresponds to the size of an opening for which leakage of fuel vapor is acceptable. For example, the CARB and EPA regulations provide for accuracy of detecting leakage of fuel vapor from fuel tank 20. The regulations require that fuel vapor leakage through an opening equivalent to an opening having a diameter of 0.5 mm should be detected. In the present embodiment, the orifice 520 has a diameter of 0.5 mm or less. The orifice passage 510 is concentrically formed at the inside of the canister port 140, so that the connecting passage 161 is formed outside and the orifice passage 510 is formed inside in a shape of a double cylinder.

The pump 200 having an inlet port 201 and the outlet port 202 is provided in the pump accommodating space 120. The inlet port 201 is exposed to the pump passage 162 and the outlet port is exposed to the discharge passage 163. A check valve 220 is disposed at the vicinity of the inlet port 201 of the pump 200. When the pump is driven, the check valve 220 is opened. When the pump is not driven, the check valve is closed to restrict the flowing of air-mixed fuel into the pump 200.

Figure 1:
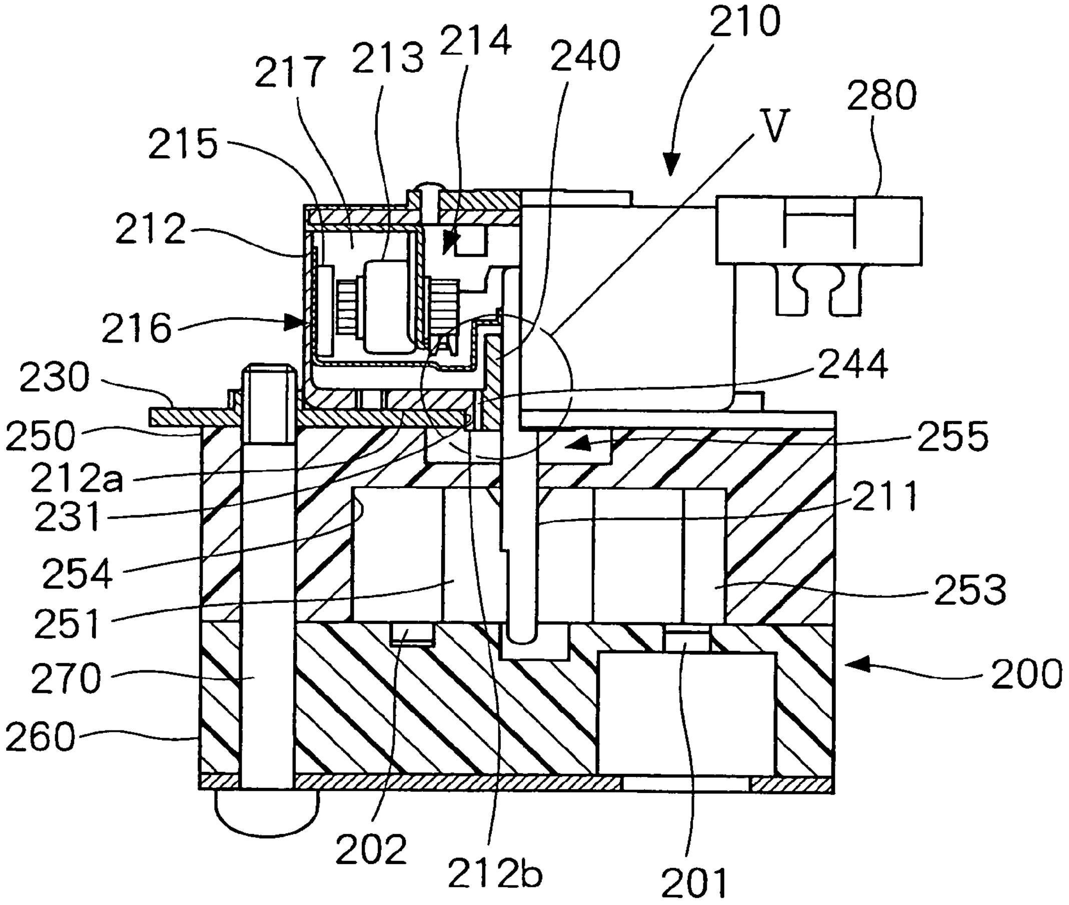
FIG. 1 is a cross sectional view of the pump and the brushless motor in the fuel vapor leak check module of a first embodiment according to the present invention.

The pump 200 is provided with a cover 250 and a case 260 to form a housing in which a rotor 251 is disposed as shown in FIG. 1. The rotor 251 has a groove in which a vane 253 is slidablly inserted in a radial direction of the rotor 251. The air introduced into the pump chamber through an inlet 201 is pressurized and is discharged from the outlet 202. The inlet 201 communicates with the fuel tank 20 through the canister 30. Thus, when the pump is operated as a suction pump, the inner pressure of the fuel tank 20 is reduced.

The pump 200 is provided with a brushless motor 210 of which driving shaft 211 is connected to the rotor 251 having the vane 253. That is, the brushless motor 210 drives the pump 200. The brushless motor 210 has a casing 212 which accommodates a stator 214 on which a coil is wounded, and a rotor 216 on which a magnet 215 is disposed. The brushless motor is a DC motor which has no electric contact point, and rotates the rotor 216 by changing a current applying position to a coil. The brushless motor 210 is electrically connected to a control circuit 280 which controls the brushless motor 210 in a constant speed by controlling electricity from an electric source. The control circuit 280 is disposed in a clearance 204 which forms the discharge passage 163. The control circuit 280 includes an electronic part generating heat such as a Zener diode. By disposing the control circuit 280 in the clearance 204, the control circuit 280 is cooled by air discharged from the pump 200.

The switching valve 300 includes a valve body 310, a valve shaft 320, and a solenoid actuator 330. The valve body 310 is disposed in the valve accommodating space 130. The switching valve 300 includes an opening-closing valve 340 and a reference valve 350. The opening-closing valve 340 includes a first valve sheet 341 and a washer 342 which is provided on the valve shaft 320. The reference valve 350 includes a second valve sheet 351 formed on the housing 110 and a valve cap 352 fixed on one end of the valve shaft 320.

The valve shaft 320 is actuated by the solenoid actuator 330 and has the washer 342 and valve cap 352. The solenoid actuator 330 has a spring 331 biasing the valve shaft 320 toward the second valve sheet 351. The solenoid actuator 330 has a coil 332 which is connected to the ECU 50 as shown in FIG. 3. The ECU 50 controls an electric supply to the coil 332. When the electric current is not supplied to the coil 332, no attracting force is generated between a fixed core 333 and a movable core 334. Thus, the valve shaft 320 fixed to the movable core 334 moves downwardly in FIG. 2 by biasing force of the spring 331 so that the valve cap 352 closes the second valve sheet 351. Thereby, the connecting passage 161 is disconnected from the pump passage 162. The washer 342 opens the first valve sheet 341 to communicate the canister port 140 to the atmospheric vent port 150 through the connecting passage 161. Therefore, when the electric current is not supplied to the coil 332, the canister port 140 is disconnected from the pump passage 162 and the canister port 140 is communicated to the atmospheric vent port 150.

When the electric current is supplied to the coil 332 according to the signal from the ECU 50, the fixed core 333 attracts the movable core 334. The valve shaft 320 connected with the movable core 334 moves upwardly against the biasing force of the spring 331. The valve cap 352 opens the second valve sheet 351, and the washer 342 closes the first valve sheet 341, whereby the connecting passage 161 communicates the pump passage 162, and the canister port 140 is disconnected to the atmospheric port 150. Therefore, when the coil is energized, the canister port 140 communicates with the pump passage 162 and the canister port 140 disconnects from the atmospheric vent port. The orifice passage 510 always communicates with the pump passage 162, regardless of whether the coil 332 is energized.

The canister 30, as shown in FIG. 3, has therein a fuel vapor adsorbent material 31 such as activated carbon granules, which adsorbs fuel vapor generated in the fuel tank 20. The canister 30 is disposed between the leak check module 100 and the fuel tank 20. The canister passage 141 connects the canister 30 with the leak check module 100, and a tank passage 32 connects the canister 30 with the fuel tank 20. A purge passage 33 connects the canister 31 to an intake pipe 41 of the intake device 40. The fuel vapor generated in the fuel tank 20 is adsorbed by the adsorbent material 31 while flowing through the canister 30. The fuel concentration in the air flowing out from the canister 30 is less than a predetermined value. The intake pipe 31 has a throttle valve 42 therein which controls air amount flowing in the intake pipe 31. The purge passage 33 has a purge valve 34 which opens and closes the purge passage 33 according to the signal from the ECU 50.

The pressure sensor 400, as shown in FIG. 2, is disposed in the sensor room 170. The pressure sensor 400 detects the pressure in the sensor room 170 and outputs signals to the ECU 170 according to the detected pressure. The sensor room 170 communicates with the pump passage 162 through the pressure introducing passage 164. Thus, the pressure in the sensor room 170 is substantially equal to the pressure in the pump passage 162. The pressure sensor 400 is disposed far from the pump 200 by which pressure fluctuation caused by the pump 200 is more reduced than the case in which the pressure sensor 400 is disposed close to the inlet port 201 of the pump 200. Therefore, the pressure sensor 400 detects the pressure in the sensor room 170 more precisely.

The ECU 50 is comprised of microcomputer, which has CPU, ROM, and RAM (not shown) and controls the leak check module 100 and other components on the vehicle. The ECU 50 receives multiple signals from sensors to execute control programs memorized in ROM. The brushless motor 210 and the switching valve 300 are also controlled by the ECU 50.

The structures of the pump 200 and brushless motor 210 are described herein after.

The pump 200 and the brushless motor 210 are accommodated in the pump accommodating space 120. The pump 200 has the cover 250 and the case 260 between which a flange 230 is disposed as shown in FIGS. 1 and 2. The cover 250, the case 260 and the flange 230 are integrally assembled by a bolt 270.

The cover 250 has a cup portion 254 in which the rotor 251 and the vane 253 are disposed. The cup portion 254 is covered by the case 260 at the side opposite to the brushless motor 210. A clearance is formed between the driving shaft 211 and the cover 250, whereby the interior of the cup portion 254 communicates to a space formed between the cover 250 and the flange 230. The interior of the cup portion 254, the clearance between the shaft 211 and the cover 250, and the space between the cover 250 and the flange 230 form a pump-side space 255.

The brushless motor 210 has the casing 212 which accommodates the stator 214 and the rotor 216. The casing 212 is attached to the flange 230 to form a motor-side space 217 therein. The motor-side space 217 is isolated from the pump-side space 255 by the casing 212, a wall 212*a* of the casing 212, and the flange 230, which comprise an isolating plate. The driving shaft 211 of the brushless motor 210 penetrates the wall 212*a* and the flange 230.

Figure 4:
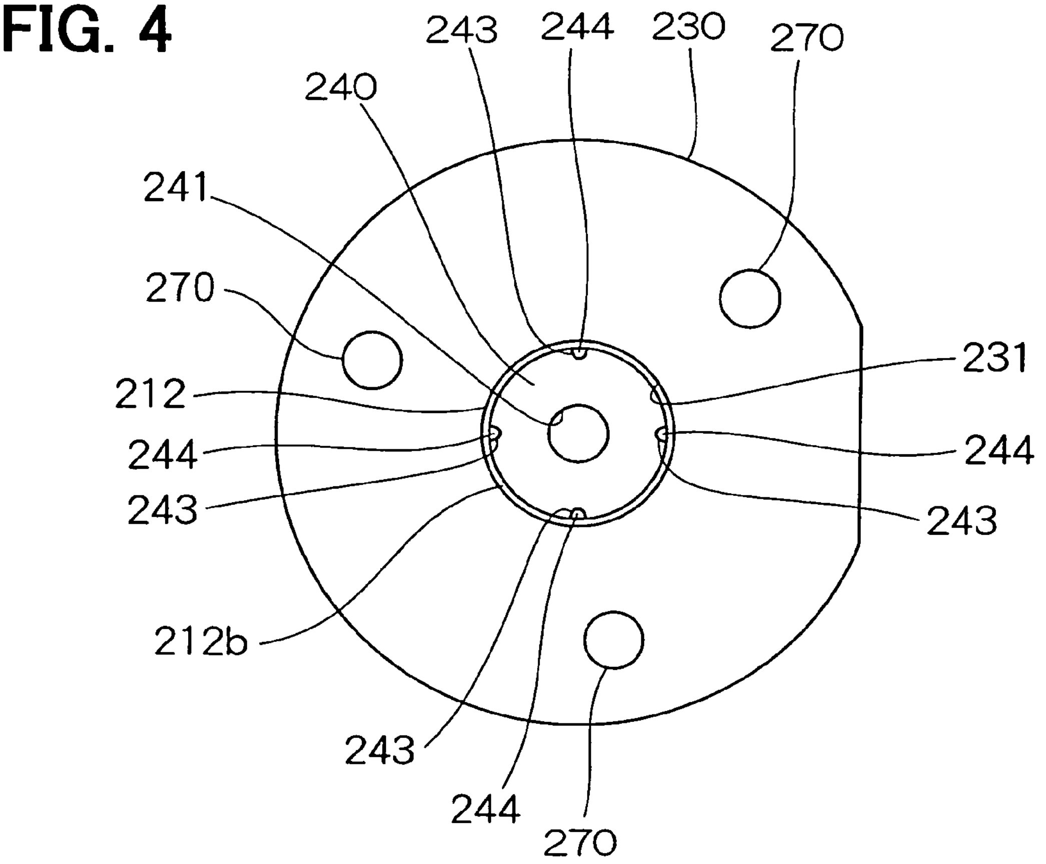
FIG. 4 is a schematic vie of the brushless motor and a flange of the fuel vapor leak check module, which is viewed from the pump side.
Figure 5:
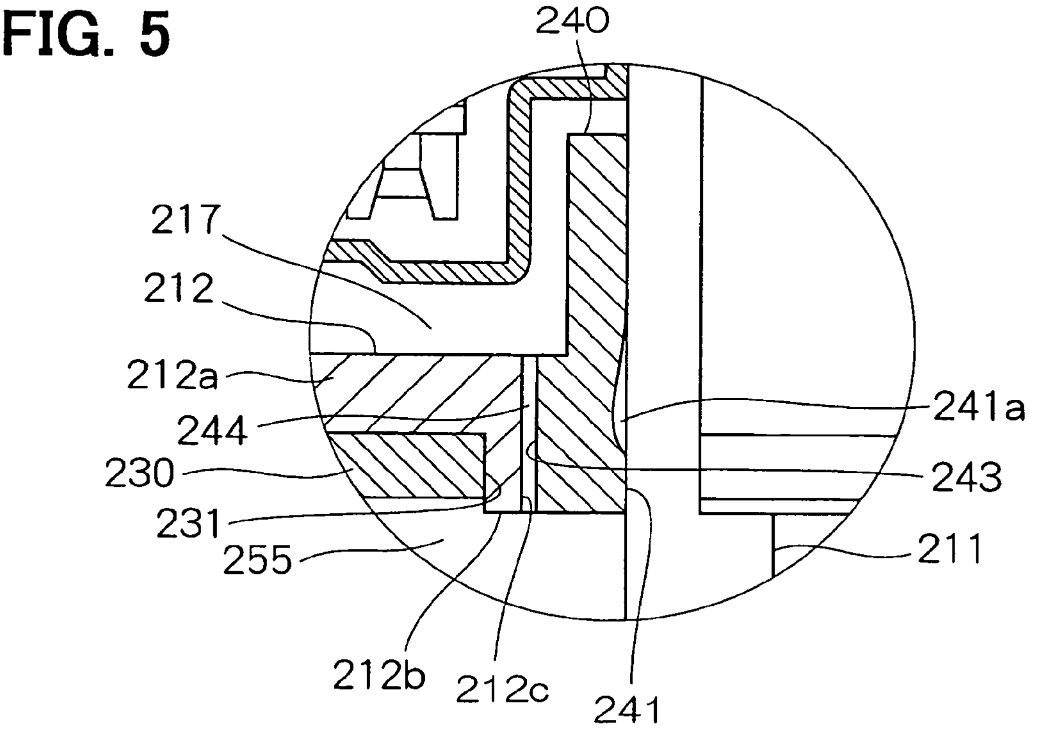
FIG. 5 is an enlarged view of a part shown by V in FIG. 1.

As shown in FIGS. 1 and 4, the flange 230 has an inner hole 231 into which an end portion 212*b* of the casing 212 is inserted. The end portion 212*b* is cylindrically shaped, into which a bearing 240 is press-fitted. The bearing 240 rotatably supports the driving shaft 211. The bearing 240 has a concave portion 241*a* between an inner surface 241 of the bearing 240 and the outer surface of the driving shaft 211. A lubricant is provided in the concave portion 241*a*.

Figure 6:
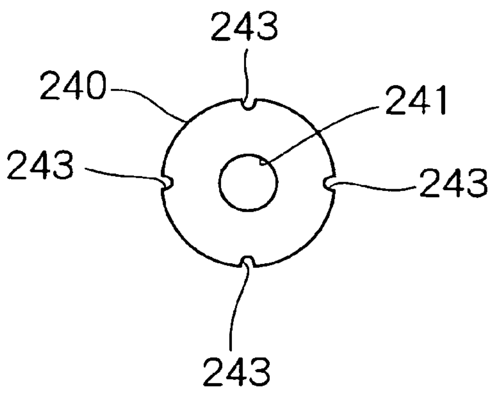
FIG. 6 is a schematic view of a bearing of the brushless motor, which is viewed from the pump side.

As shown in FIG. 6, the bearing 240 has a plurality of grooves 243 at the outer periphery thereof in a constant interval or inconstant interval. The groove 243 extends in an axial direction of the bearing 240. The cross section of the groove 243 is semi-circle. The inner surface 212*c* of the casing 212 confronts the groove 243 to form a communicating passage 244 which is semi-cylindrical. One end of the communicating passage 244 is opened in the pump-side space 255 and another end is opened in the motor-side space 217. That is, the pump-side space 255 and the motor-side space 217 communicate with each other through the communicating passage 244.

When the pump 200 is driven by the brushless motor 210, the internal pressure of the pump-side space 255 is reduced. Thus, the internal pressure of the motor-side space 217 is to become higher than the internal pressure of the pump-side space 255, so that a suction force is to be generated from the motor-side space 217 toward the pump-side space 255. However, the motor-side space 217 and the pump-side space 255 are communicated with each other through the communicating passage 244. Therefore, each of the inner pressure of both spaces 217, 255 becomes substantially equal to each other. The lubricant in the bearing 240 does not flow out into the pump-side space 255.

In another embodiment, the pump 200 can be a pump which pressurizes the interior of the fuel tank 20. The pressure in the pump-side space 255 is to become higher than that in the motor-side space 217. However, because the space 217 communicates with the space 255, the inner pressure of both spaces become equal to keep the lubricant in the concave portion 241*a*, not to generate flowing of lubricant toward the motor-side space 217.

The operation of the leak check module 100 is described herein after.

When a predetermined period elapses after the engine is turned off, the fuel vapor leak check is conducted. The predetermined period is set to stabilize the vehicle temperature. While the engine is running and until the predetermined period elapses after the engine is turned off, the fuel vapor leak check by the leak check module 100 is not conducted. The coil 332 is not energized, and the canister port 140 and the atmospheric vent port 150 are connected with each other through the connecting passage 161. The fuel vapor fraction of the fuel vapor/air mixture adsorbs in the canister 30. Then, the air fraction is expelled from the opening end 153 of the atmospheric passage 151. At this moment, the check valve 220 is closed, air including fuel vapor generated in the fuel tank 20 is prevented from flowing into the pump 200.

(1) When the predetermined period elapses after the engine is turned off, an atmospheric pressure is detected prior to the fuel vapor leak check. That is, since the fuel vapor leak check is conducted based on the pressure change with the pressure sensor 400, it is necessary to reduce an atmospheric effect due to altitude. When the coil 332 is not energized, the atmospheric vent port 150 communicates with the pump passage 162 through the orifice passage 510. Because the sensor room 170 communicates with the pump passage 162 through the pressure introducing passage 164, the pressure in the sensor room 170 is substantially equal to the atmospheric pressure. The atmospheric pressure detected by the pressure sensor 400 is converted to a pressure signal, the pressure signal being output to the ECU 50. The pressure signal from the pressure sensor 400 is outputted as a ratio of voltage, a duty ratio, or a bit output. Thus, the noise effect generated by the solenoid actuator 330 or other electric actuators can be reduced to maintain the detection accuracy of the pressure sensor 400. At this moment, only the pressure sensor 400 is turned on and the brushless motor 210 and the switching valve 300 are turned off. This state is indicated as an atmospheric pressure detection period A in FIG. 7. The pressure detected in the sensor room 170 is equal to the atmospheric pressure.

(2) After the atmospheric pressure is detected, the altitude at which the vehicle is parked is calculated according to the detected atmospheric pressure. For example, the altitude is calculated based on a map showing a relationship between the atmospheric pressure and the altitude, which is memorized in ROM of the ECU 50. The other parameters are corrected according to the calculated altitude. The calculation and the correction above are executed by ECU 50.

Figure 7:
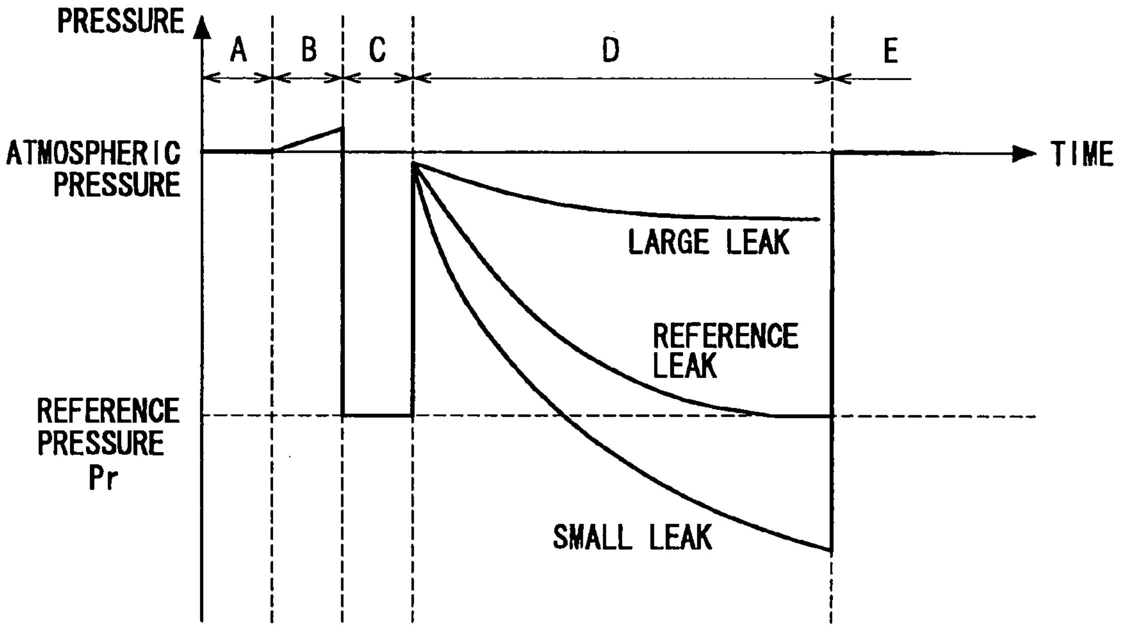
FIG. 7 is a graph showing pressure change detected by a pressure sensor.

After the correction of parameters is executed, the coil 332 of the switching valve 300 is energized of which state is indicated as a fuel vapor detection period B in FIG. 7. Since the coil 332 is energized, the fixed core 333 attracts the movable core 334 so that the washer 342 closes the first valve sheet 341 and the valve cap 352 opens the second valve sheet 351. The atmospheric vent port 150 disconnects from the pump passage 162, and the canister port 140 connects to the pump passage 162. As a result, the sensor room 170 connected to the pump passage 162 is connected with the fuel tank 20 through the canister 30. The pressure in the fuel tank 20 is larger than the ambient pressure due to the fuel vapor. The pressure detected by the pressure sensor 400 is slightly larger than the atmospheric pressure as shown in FIG. 7.

(3) When the increment of the pressure in the fuel tank 20 is detected, the coil 332 of the switching valve 300 is deenergized. This state is indicated as a reference detection range C in FIG. 7. The moving core 334 and the valve shaft 320 move in biasing direction of the spring 331 so that the washer 342 opens the first valve sheet 341 and the valve cap 352 closes the second valve sheet 351. The pump passage 162 communicates with the canister port 140 and the atmospheric vent port 150 through the orifice passage 510. The canister port 140 communicates with the atmospheric vent port 150 through the connecting passage 161.

When the brushless motor 210 is energized, the pump 200 is driven to reduce the pressure in the pump passage 162, so that the check valve 220 is opened. The air flowing into the canister port 140 from atmospheric vent port 150 and air/fuel mixture flowing from the canister port 140 flow into the pump passage 162 through the orifice passage 510. Because the air flowing into the pump passage 162 is restricted by the orifice 520 in the orifice passage 510, the pressure in the pump passage 162 is decreased as shown in FIG. 7. Since the orifice 520 has a constant aperture, the pressure in the pump passage 162 is decreased to a reference pressure Pr, which is memorized in RAM of the ECU 50. After the reference pressure Pr is detected, the brushless motor 210 is deenergized.

(4) When the detection of reference pressure is finished, the coil 332 of the switching valve 300 is energized again. The washer 342 closes the first valve seat 341 and the valve cap 352 opens the second valve sheet 351, so that the canister port 140 communicates with the pump passage 162. That is, the fuel tank 20 communicates with the pump passage 162, so that the pressure in the pump passage 162 becomes equal to the pressure in the fuel tank 20. The pressure in the fuel tank 20 is almost the atmospheric pressure. The brushless motor 210 is energized again to drive the pump and to open the check valve 220 so that the pressure in the fuel tank 20 decreases. The pressure in the sensor room 170, which is detected by the pressure sensor 400, decreases gradually. This state is illustrated as decompression range D in FIG. 7.

While the pump 200 is operated, when the pressure in the sensor room 170, which is equal to the pressure in the fuel tank 20, becomes under the reference pressure Pr, it is determined that the amount of fuel vapor leakage is under the permissible value. In other words, no air is introduced into the fuel tank 20 from outside, or amount of air introducing into the fuel tank is less than the amount which is equivalent to the orifice leakage. Therefore, it is determined that the sealing of the fuel tank 20 is enough.

On the other hand, when the pressure in the fuel tank 20 does not decrease to the reference pressure Pr, it is determined that the amount of fuel vapor leakage is over the permissible value. It is likely that the outside air is introduced into the fuel tank 20 during the depressurization. Therefore, it is determined that the sealing of the fuel tank 20 is not enough. In this case, it is likely that the fuel vapor in the fuel tank 20 escapes over the permissible value. When it is determined that impermissible amount of fuel vapor leakage exists, a warning lamp on a dashboard (not shown) is turned on to notify the driver of fuel vapor leakage at a successive operation of the vehicle.

When the pressure in the fuel tank 20 is almost equal to the reference pressure Pr, it means that the fuel vapor leakage arises, the fuel vapor leakage being equivalent to the fuel vapor leakage through the orifice 520.

(5) When the detection of fuel vapor leakage is finished, the brushless motor 210 and the switching valve 300 are turned off. This state is illustrated as a range E in FIG. 7. In the ECU 50, it is confirmed that the pressure in the pump passage 162 is recovered to the atmospheric pressure as shown in FIG. 7. Then, the pressure sensor 400 is turned off to finish the all-detecting step.

In the first embodiment, the communicating passage 244 communicates the pump-side space 255 with the motor-side space 217 to equalize the inner pressure of both spaces 255, 217. Therefore, the lubricant in the concave portion 241*a* is prevented from flowing out toward the pump-side space 200.

The communicating passage 244 is formed between the groove 243 and the inner surface 212*c* of the casing 212. That is, the communicating passage 244 is formed only by making a groove 243 without machining the casing 212 and the flange 230.

Multiple communicating passages 244 are arranged in the circumferential direction on the bearing 240. Although the depth of the groove 243 is small, enough of area of the communicating passage 244 is obtained by a summation of each area of the communicating passage 244. Because it is needless to make the depth of the groove 244 large to obtain the enough area of communicating passage 244, a deterioration of the strength of the bearing 240 is restricted.

Modification of the First Embodiment

Figure 8:
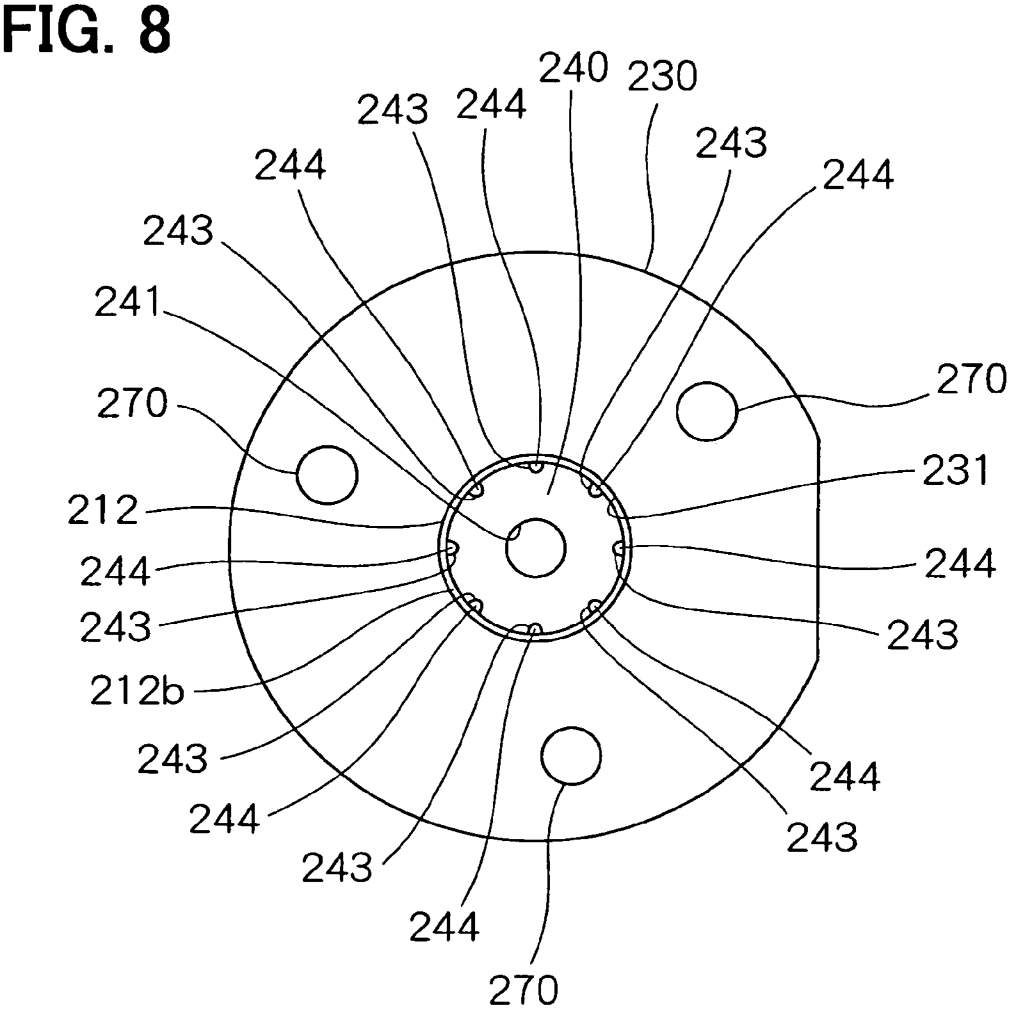
FIG. 8 is a schematic view of the brushless motor and the flange of the modification of the first embodiment, which is viewed from the pump side.

FIG. 8 shows a modification of the first embodiment. In this modification, eight communicating passages 244 are provided between the bearing 240 and the casing 212 in a constant interval. The interval can be inconstant.

Figure 9:
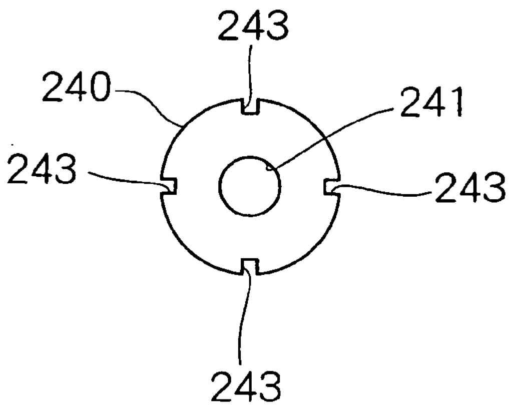
FIG. 9 is a schematic view of the bearing applied to the modification, which is viewed from the pump side.

FIG. 9 shows another modification. The cross section of the groove 243 is substantially rectangle instead of semicircle.

Figure 10:
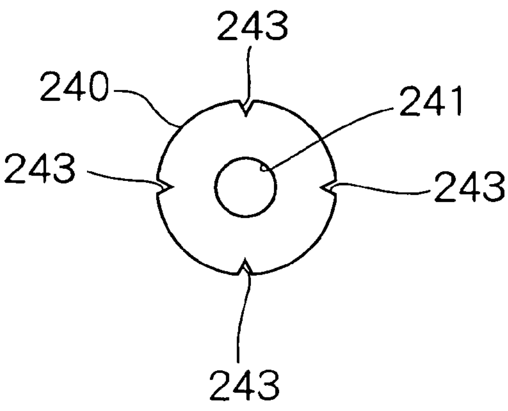
FIG. 10 is a schematic view of the bearing applied to the modification, which is viewed from the pump side.

FIG. 10 shows another modification. The cross section of the groove 243 is substantially triangle.

Second Embodiment

Figure 11:
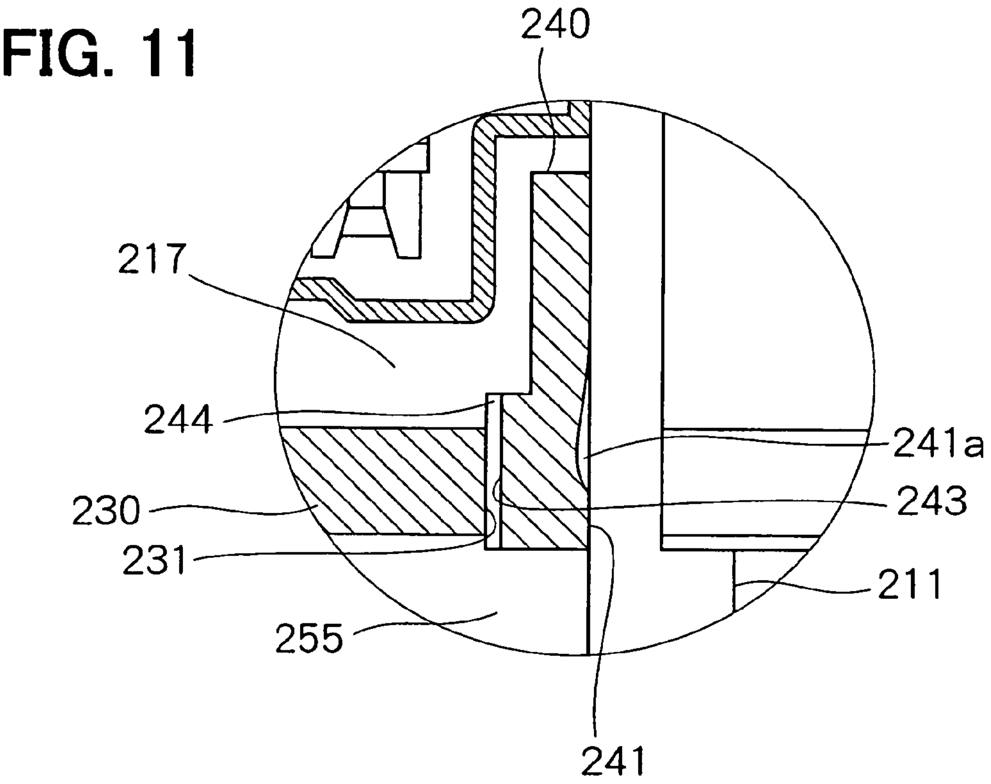
FIG. 11 is an enlarged view of the vapor leak check module of the second embodiment, which corresponds to the part V in FIG. 1 of the first embodiment.

FIG. 11 shows a part of brushless motor of the second embodiment. The same parts and components as those in the first embodiment are indicated with same reference numerals and the same descriptions are not reiterated. The bearing 240 is press-fitted into the flange 230 instead of the casing 212. The communication passage 244 is formed between the bearing 240 and the flange 230. The flange 230 can support the bearing 240.

Third Embodiment

Figure 12:
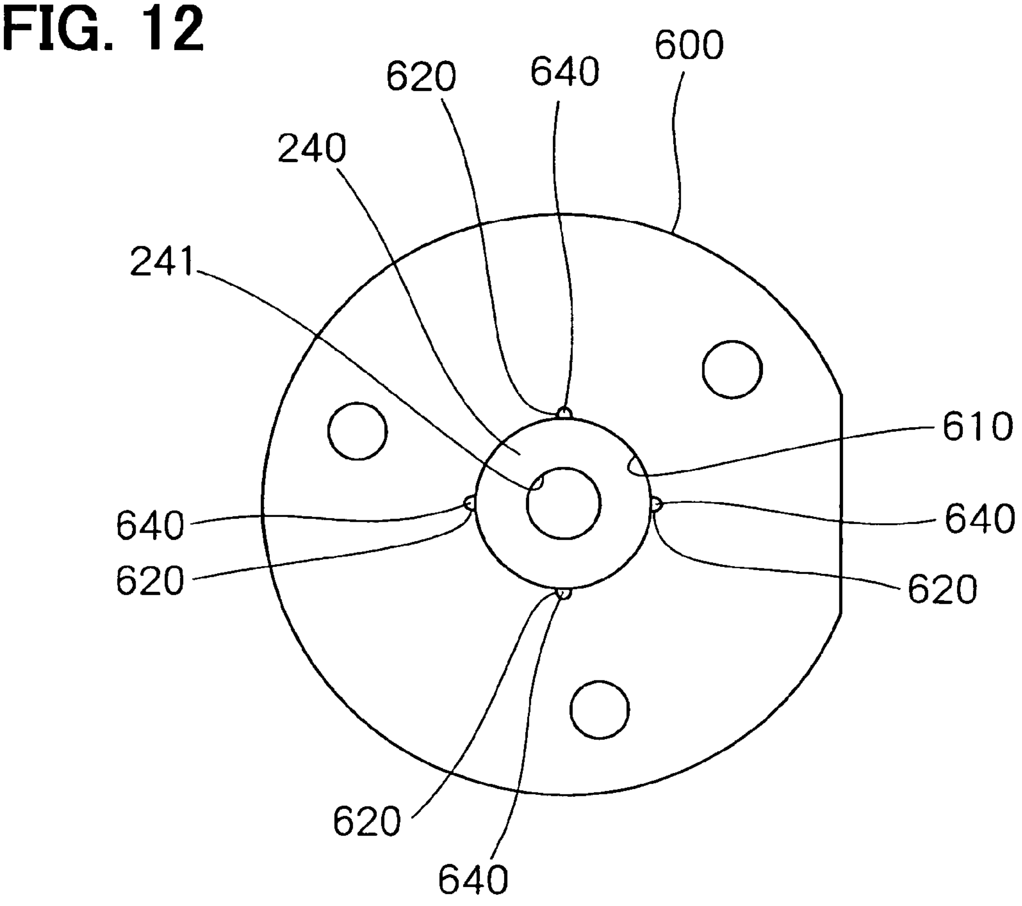
FIG. 12 is a schematic view of the brushless motor and the flange of a third embodiment.

FIG. 12 shows a flange 600 viewed from the side of pump 200. The bearing 240 is inserted into an inner hole 610 of a flange 600 as well as the second embodiment. The outer surface of the bearing 240 is a continuous surface without any grooves. On the other hand, the flange 600 has four grooves 620 at an inner periphery thereof in constant interval. The communicating passages 640 are made between the flange 600 and the bearing 240 to communicate the motor-side space 217 with the pump-side space 255.

When the pump 200 is driven, the pressure gradient arises between the motor-side space 217 and the pump-side space 255. The communicating passage 640 communicates both spaces 217, 255, so that the pressure gradient is diminished to the same pressure. The lubricant in the concave portion 241*a* is prevented from flowing out toward the pump-side space 255.

In the third embodiment, because the grooves 620 are formed on the flange 600, a complicated shape of the bearing 240 can be avoided.

Fourth Embodiment

Figure 13:
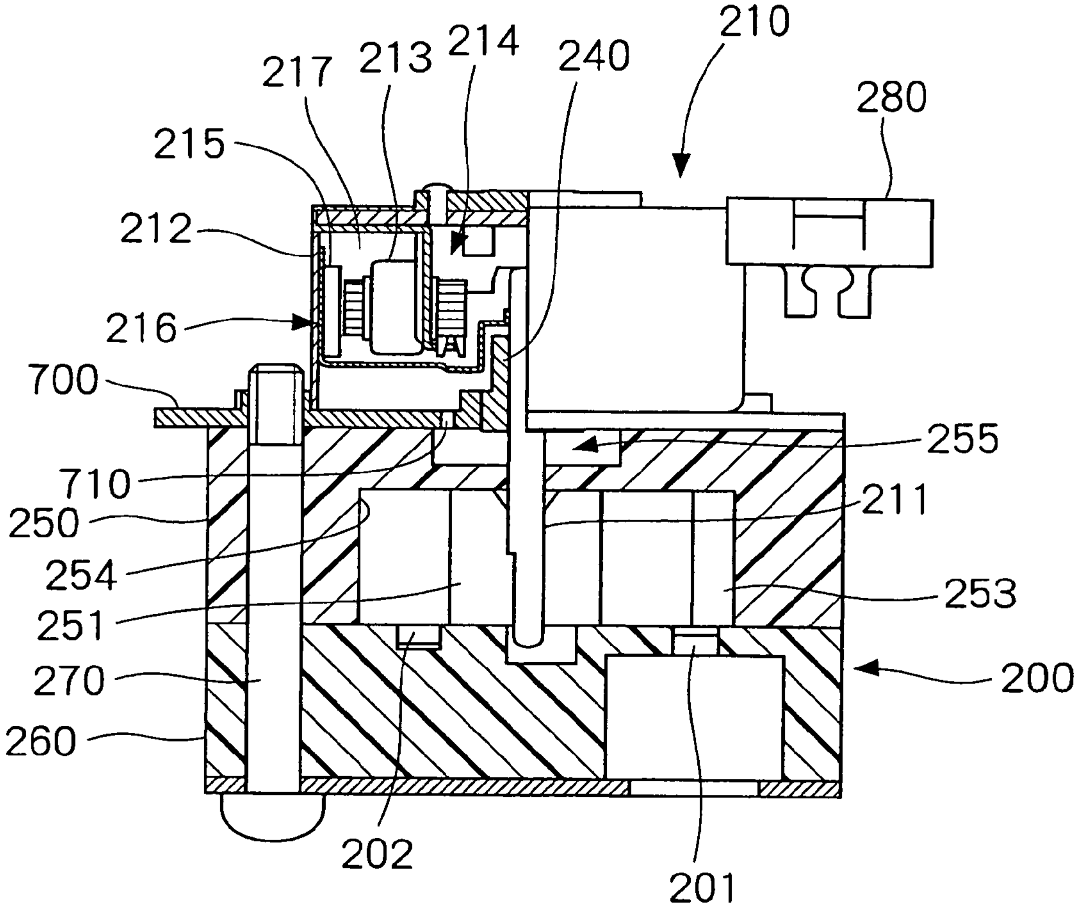
FIG. 13 is a cross sectional view of the pump and the brushless motor of a fourth embodiment.

FIG. 13 shows a brushless motor and the pump of the fourth embodiment. The same parts and components as those in the first embodiment are indicated with same reference numerals and the same descriptions are not reiterated. The communicating passage 710 is formed in such a manner that the communicating passage 710 penetrates the flange 700. The communicating passage 710 can be positioned at any position of the flange 700 in which the motor-side space 217 communicates with the pump-side space 255.

Another Modification

Figure 14:
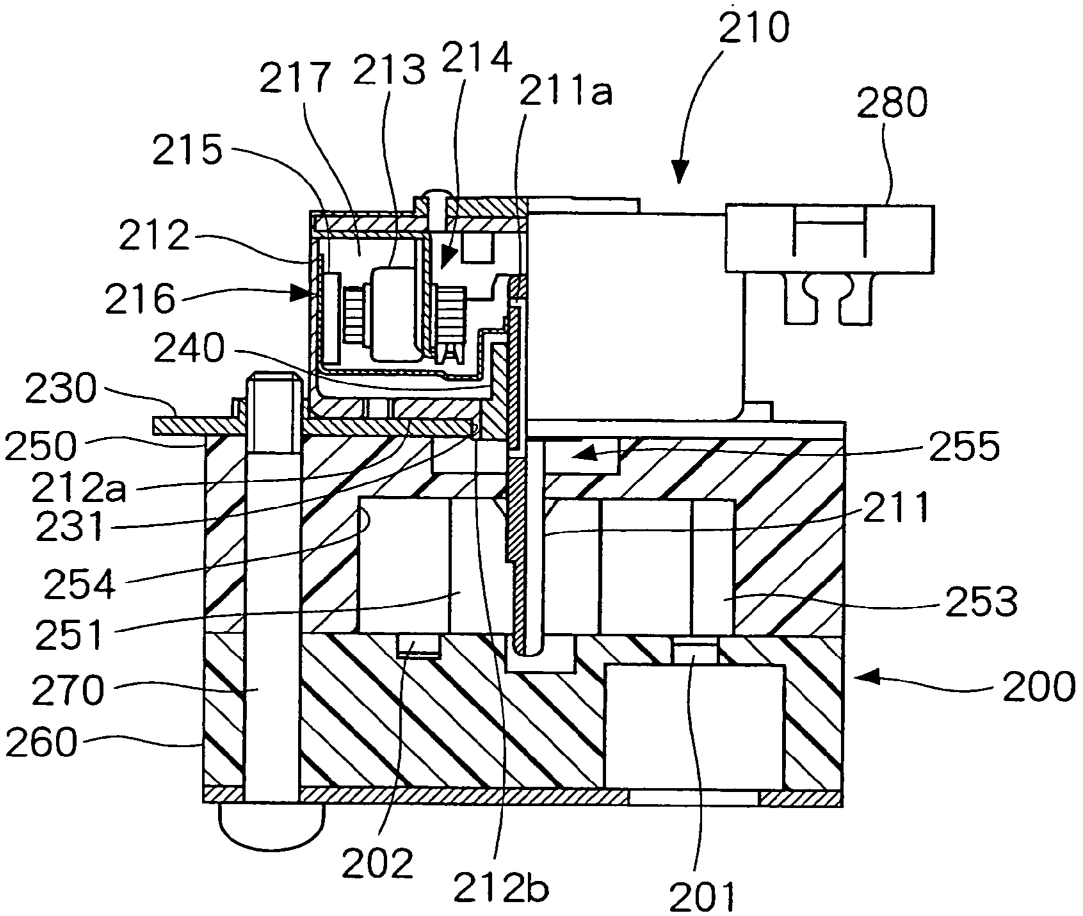
FIG. 14 is a cross sectional view of the pump and the brushless motor of a fifth embodiment.

As shown in FIG. 14, the communicating passage 211*a* can be made in the driving shaft 211, which communicates the motor-side space 217 with the pump-side space 255.

The same parts and components as those in the first embodiment are indicated with same reference numerals and the same descriptions are not reiterated.

In the embodiments described above, the brushless motor is used and the vane-type pump is used. The motor is not limited to the brushless motor but conventional DC motor or an induction motor can be used. A turbine-type pump or impeller-type pump can be used.

Each of the embodiments can be combined to achieve the effect of the present invention.

What is claimed is:

1. A fuel vapor leak check module for detecting a fuel vapor leakage from a fuel tank by pressurizing or depressurizing the inside of the fuel tank, the fuel vapor leak check module comprising:

a pump pressurizing or depressurizing the inside of the fuel tank;

a motor having a driving shaft for driving the pump;

an isolating plate isolating the pump from the motor in an axial direction of the driving shaft, the driving shaft penetrating the isolating plate;

a communicating passage which communicates a pump-side space formed in the pump with a motor-side space formed in the motor; and a bearing rotatably supporting the driving shaft wherein the communicating passage is formed around the bearing.

2. The fuel vapor leak check module according to claim 1, wherein the communicating passage is defined by a groove and the isolating plate, the groove formed on an outer surface of the bearing in an axial direction thereof, the groove confronting to the isolating plate.

3. The fuel vapor leak check module according to claim 1, wherein the communicating passage is defined by a groove and the isolating plate, the groove formed on an inner surface of the isolating plate, the groove confronting to an outer surface of the bearing.

4. The fuel vapor leak check module according to claim 2, wherein a plurality of the communicating passages are formed around the bearing.

5. The fuel vapor leak check module according to claim 3, wherein a plurality of the communicating passages are formed in the axial direction of the bearing.

* * * * *